US006025685A

United States Patent [19]

Parsadayan

[11] Patent Number: 6,025,685

[45] Date of Patent: Feb. 15, 2000

[54] GATE OPERATOR METHOD AND APPARATUS WITH SELF-ADJUSTMENT AT OPERATING LIMITS

[75] Inventor: Walter Parsadayan, Lake Forest, Calif.

[73] Assignee: Elite Access Systems, Inc., Lake Forest, Calif.

[21] Appl. No.: 08/872,942

[22] Filed: Jun. 11, 1997

[51] Int. Cl.[7] .......... G05B 5/00

[52] U.S. Cl. .......... 318/471; 318/468; 318/266; 318/282; 49/28; 49/139

[58] Field of Search .......... 49/18, 28, 39, 49/349, 358; 318/282, 466–468, 471–3, 266

[56] References Cited

U.S. PATENT DOCUMENTS 4,234,833 11/1980 Barrett .......... 318/282
4,429,264 1/1984 Richmond .......... 318/466
4,564,791 1/1986 Brickner .......... 318/16
4,916,860 4/1990 Richmond et al. .......... 49/28
5,076,012 12/1991 Richmond et al. .......... 49/28
5,136,809 8/1992 Richmond et al. .......... 49/28
5,230,179 7/1993 Richmond et al. .......... 49/28
5,729,101 3/1998 Richmond et al. .......... 318/282

*Primary Examiner*—David Martin
*Attorney, Agent, or Firm*—Oppenheimer Wolff & Donnelly LLP

[57] ABSTRACT

An automatic gate operator includes an electric drive motor coupled by a drive train to a movable gate, and includes provision for measuring the coasting distance which the gate moves after shut off of the drive motor. This coasting distance varies both with the weight and momentum of the gate in comparison to frictional drag of the gate hardware, and the drag provided by the gate operator with the drive motor shut off, and also varies in response to a great number of other variables many of which are unpredictable. These other variables include such factors as wind, weather, temperature, wear, adequacy of lubrication, time interval since last operation of the gate operator, and off-level installation of the gate, for example. However, the coasting distance is measured and recorded, and is subsequently used as a predictor of gate coast on subsequent operation of the gate operator in order to coast the gate to a stop precisely at a selected limit position. The prediction improves with experience, and compensates over time for progressive changes in the operating circumstances and conditions of the gate.

17 Claims, 6 Drawing Sheets

GATE OPERATOR METHOD AND APPARATUS WITH SELF-ADJUSTMENT AT OPERATING LIMITS

BACKGROUND OF THE INVENTION

1. Field of the Invention

The present invention is in the field of method and apparatus for power-operation of a gate. More particularly, the present invention relates to a power-drive apparatus for moving a gate between opened and closed positions.

2. Related Technology

It is conventional to move gates, such as those which control access to a parking lot, to a gated community, or to private land, for example, by means of a power-drive unit which moves the gate between fully opened and fully closed positions. The gate may move horizontally along a guide way, may swing about a vertical hinge axis to open and close, or may be of "turn pike" barrier-gate type in which the barrier swings up through about 90°. This latter type of barrier gate is commonly used in parking garages to control vehicle ingress and egress.

Ordinarily, the power-drive unit for such gates includes an electric motor with a speed reduction drive train coupled to the gate to effect its movement between the opened and closed positions. The limits of movement of the gate itself are generally set using conventional limit switches. Alternatively, the mechanism of the gate operator may be configured such that an approximate opened and closed position for the gate is set by the mechanical operation constraints of the mechanism itself. However, in each of these cases, the combined momentum of the drive motor, its speed reduction, and of the gate itself can result in the gate stopping short of its desired limit positions, or in overshooting the limit positions set by the limit switches or by the gate operating mechanism.

Thus, gate operators which rely upon limit switches alone to determine the limit positions of a gate are prone to apparently erratic changes in gate limit positions, and frequent complaints from owners that the gate operator is out of adjustment. One reason for this is because the gate operator and gate will be subject to differing levels of mechanical drag and friction during various operations, and will coast differing distances after the drive motor is shut off on various operations. Thus, the gate will coast to a position short of its desired fully opened or fully closed position, or will over-coast and strike a physical barrier in one of these positions.

In some cases, the amount of overshoot or coast of a gate beyond the limit position set by a limit switch can be sufficient that the gate either contacts a physical barrier, runs off the end of its guide way, or requires that a considerable overrun distance be provided for the gate in its guide way. In the former event, the gate and its gate operator power drive system are subjected to a severe impact, which can shorten their service lives. Additionally, the user of the gate will likely object to the jarring and noise such impact produces. In the latter event, the user will be quite unhappy with the gate operator mechanism because the gate will likely require manual restoration onto its guide way, and will probably be inoperative in an opened or closed position until this manual restoration of the gate is completed.

Some gate operators, in addition to the use of limit switches employ a braking device to physically stop movement of the gate and its associated drive motor and drive train when the desired limits of the gate's movement are reached. In other words, coasting of the gate is limited or eliminated in an attempt to set limit positions for the gate. The braking device is usually installed in the drive train of the gate operator, and may be actuated by the same limit switches which shut off the drive motor. In this case, a certain increment of added drive train shock and wear are attributable simply to the use of such a braking device. This is the case because in the moments before the brake is applied the drive train is involved in moving the gate in a certain direction (i.e., opening or closing the gate). However, immediately upon the brake being applied, the drive train is involved in decelerating and stopping the gate from moving in that certain direction. As a result, any slack or lost motion in the drive train it taken up quickly, and results in an impact or jarring in the drive train.

Moreover, the sudden reversal of forces caused within the drive train by the engagement of a braking device has the effects of imposing added strains on the components of the gate operator, increasing wear on the gate operator, and increasing its maintenance requirements. That is, in addition to the wear and tear of the drive train occasioned simply by driving the gate between its opened and closed positions, the drive train of a gate operator with a braking device is also subjected to a shock when braking is applied, and must endure the added wear and tear of being used to bring the gate to a halt at selected positions. Understandably, the heavier the gate is, and the more severe the shock of initial braking application and the more rapid the deceleration effected for the gate, the greater the adverse effect on the drive train of the gate operator will be.

Unfortunately, with many conventional gate operators, the only way to insure that the gate will stop at particular limit positions, and will not stop short of a fully opened or fully closed position, nor coast beyond these fully opened and fully closed positions to impact physical stops for the gate with undesired impact and noise, or to run off of a guide way, for example, is to use a definite (or immediate) and strong (as opposed to gradual and gentle) application of the braking device at particular limit positions. A shock in the drive mechanism for the gate inevitably results. Again and understandably, the heavier the gate moved by a gate operator and the greater its speed of movement (i.e., the greater the gate's momentum), the stronger the braking force required, and the greater the adverse effects of using the gate operator to brake movement of the gate. Further, the inclusion of a braking device in a gate operator undesirably increases the initial costs for the gate operator.

Another consideration with the so-called "barrier" gate operators is the lack of repeatability in the rest (i.e., gate closed) position for the gate arm with conventional operators. Such barrier gates are very common in parking garages, where they are used to control ingress and egress of motor vehicles from the garage. With these gate operators, the gate arm is carried by the gate operator itself, and is usually a length of wood or composite material weighing only a few pounds. However, in such a use the gate operator may experience a million operating cycles or more for each year of its service life, and may be expected to provide reliable service over several years of life. Thus, wear and tear of such a barrier gate operator is an important consideration.

Also, a barrier gate operator may cycle ever few seconds during intervals of heavy vehicle traffic, or may set for hours without cycling opened and closed during a weekend or evening, for example. Regardless of whether the recent service experience for the barrier gate operator has been one of frequent operations every few seconds, or one of a time interval of several hours since the last gate opening and closing cycle, the owners of such gate operators want the operation of the gate to be repeatable. That is, reliability of operation is very important, as is the appearance of operating crisply and with "military-like" precision. Moreover, owners of conventional barrier gate operators of this kind frequently object to the fact that the gate arm is stopped in a "droopy" position (i.e., below horizontal) on some occasions, and stops in a "half up" or slightly above horizontal position on other occasions.

Conventional gate operators are seen in U.S. Pat. Nos. 4,234,833; 4,429,264; 4,916,860;; 5,136,809; and 5,230, 179. Of these conventional teachings, the '833 patent purports to include in an opening count of incremental movements of a gate that movement caused by coasting after the drive motor is shut off. Thus, this incremental coasting movement can be included also in the closing movement of the gate in order to insure that from its fully opened position the gate reaches its fully closed position. However, historical coasting of the gate after drive motor shut off is apparently not used in the art to predict gate coast during a current operation in order to stop the gate at a limit position.

SUMMARY OF THE INVENTION

In view of the above, it is desirable to provide a gate operator which uses historical information about coasting of the gate after drive motor shut off to predict gate coast during a current operation in order to stop the gate at a limit position.

Also, it would be desirable to provide a gate operator which does not require use of a braking device in order to effect precise and repeatable stopping of a gate at its limit positions.

Still further, it would be desirable to provide such a gate operator which does not impose a shock loading on the drive train of the operator in order to provide precise stopping of the gate at a limit position.

Additionally, it would be desirable to provide such a gate operator which does not allow the gate to either stop significantly short of its limit positions, nor drive the gate significantly beyond these limit positions with resulting impact on a physical stop or running of the gate off its guide way.

Still further, it would be desirable to provide a gate operator which, either on a short term basis or both on a short term basis as well as long term, monitors historical information about gate operation, and uses also significant novel factors concerning the circumstances of each gate operation in order to predict the coasting dimension of the gate after motor shut off to control motor shut off during a particular operation and to stop the gate by run out of its own momentum at a selected limit position.

Accordingly, the present invention in one aspect provides a gate operator including an electric motor and motor controller circuit; a speed reduction gear train coupling the electric motor to a gate for moving the gate between opened and closed positions; a limit switch assembly having an element drivingly coupled to the gate to move between corresponding first and second positions in response to movement of the gate between opened and closed positions, the limit switch assembly including at least one limit switch responsive to movement of the element between the first and second positions; an encoder associated with the element for providing a pulse train responsive to movement of the element between the first and second positions; a microprocessor-based control system including a memory facility and receiving the pulse train and an input from the limit switch, and responsively providing an output signal to shut off the electric motor, the control system recording in the memory facility a pulse count from the pulse train which pulse count is indicative of coasting of the gate to a stop position after shut off of the electric motor, the control system including means for effecting a comparison between the stop position of the gate and a desired limit position for the gate, and the control system further predicting gate coast on a future operation based on the pulse count to adjust shutting off of the electric motor during the future operation to coast the gate to a stop substantially at the limit position.

According to another aspect, the present invention provides a method of power-operating a movable gate member, the method comprising steps of: providing an electric motor; coupling the electric motor by a speed reduction drive to the movable gate to move the gate between opened and closed positions; operating the electric motor to move the gate toward a desired limit position and shutting off the electric motor; measuring the deviation from the desired limit position at which the gate stops by coasting after the electric motor is shut off; and using the deviation measurement to predict a correction factor applied to shut off the electric motor during a subsequent operation moving the gate toward the desired limit position.

Significantly, the coasting movement of a gate after drive motor shut off may be almost negligible, or may be substantial, especially with gates of large size and great mass. The extent to which a gate will coast after its drive motor is shut off is dependent on a great number of variables, including such uncontrollable or unpredictable conditions as weather, wind, ambient temperature, the time interval since the gate was last operated, accumulation of debris along the guide way, lubrication (or lack thereof) on moving parts of the gate and operator, the condition of the gate including its pivot, hinges or wheels (i.e., shifting of the earth, wear, rusting, binding, or misalignment), and the general wear and tear to which the drive train of the gate operator has been subjected during its service life to a particular time.

As can be appreciated, many of these factors influencing gate coast are uncontrollable (or are uncontrolled in most situations), some are progressive during the life of a gate and its operator, while others vary with each gate operation (i.e., ambient temperature and the time interval since last operation, for example), and some vary with the particular gate and gate operator installation and use environment including traffic levels at differing times of the day and off-level installation of the gate, for example.

However, it has been discovered that the extent of gate coast on a particular occasion can be predicted on the basis of short-term experience (or short-term experience along with long-term experience) with the gate and its operator. Preferably, this historical experience is combined with information concerning the time interval since last gate operation, and ambient temperature, in order to provide a predictive value which is used to provide precise stopping of the gate at its desired limit position. The effects of long-term changes in the gate and the operator are automatically taken into account and are compensated for on an iterative basis. Short term effects (i.e., ambient temperature, for example) are measured or sensed and compensated for on the basis of accumulated past experience.

An advantage of the present invention derives from its use of a predictor-corrector type of operating methodology. That is, at least recent past experience in the operation of the gate is used by the gate operator to predict its operation on each particular occasion. In this way, changes in the operation of the gate resulting from (for example) wear, progressive fouling or rusting of the guide way, clearing of such fouling, lack of lubrication, or addition of lubrication, maintenance of the guide way and gate with improved free running, wear of the drive train, and a myriad of other factors which can change with the passage of time or, with the absence of maintenance on the gate, or with performance of maintenance on the gate or its operator, and which would result in a conventional gate operator either not closing or opening the gate entirely, or in running the gate against the physical stops or off the guide way, are all compensated for by a gate operator embodying the present invention.

Also, a significant advantage of the present invention results from its use of gate momentum and coasting to simply allow the gate to coast to a stop at a selected limit position without the use or a brake. This method of moving the gate toward and coasting it to a stop at a selected limit position provides the smoothest and most gentle operation possible within the design and cost constraints for a gate operator. As a result, maintenance requirements for the gate and its operator are believed to be reduced.

Anther significant advantage of the present invention results for the improvement with experience of the coasting predictor. That is, with the passage of time and the acquisition of experience, the stopping position of the gate will most closely approximate the desired limit positions after the gate operator acquires some experience and historical information about how the gate operates. Also, with changing conditions in gate operation, the operator will compensate. Thus, owners of such gate operators will seldom or never experience an "out of adjustment" condition.

A better understanding of the present invention will be obtained from reading the following description of a single preferred exemplary embodiment of the present invention when taken in conjunction with the appended drawing Figures, in which the same features (or features analogous in structure or function) are indicated with the same reference numeral throughout the several views. It will be understood that the appended drawing Figures and description here following relate only to one or more exemplary preferred embodiments of the invention, and as such, are not to be taken as implying a limitation on the invention. No such limitation on the invention is implied, and none is to be inferred.

BRIEF DESCRIPTION OF THE DRAWING FIGURES

FIG. 1 provides a fragmentary perspective view of a gate operator embodying the present invention moving a "sliding" gate relative to a gate opening between opened and closed positions;

FIG. 2 is a somewhat schematic perspective view of the gate operator shown with its weather cover illustrated in phantom, and from the opposite side from that shown in FIG. 1;

FIG. 3 provides a cut away perspective view of a limit switch and encoder assembly of the gate operator, which provides signals indicative of gate movement and position;

FIG. 4 is a schematic illustration of an electrical and electronic control circuit portion of the gate operator;

FIG. 5 provides a schematic illustration of a portion of the device seen in FIG. 3, along with a graphical representation of experiences in operation of a gate and iterative corrective actions taken by the gate operator;

FIGS. 6 and 7 provide illustrations of hypothetical histograms compiled by a gate operator embodying the present invention;

FIG. 8 provides a fragmentary perspective view of a gate operator embodying the present invention moving a "swing" gate relative to a gate opening between opened and closed positions;

FIG. 9 is a somewhat schematic perspective view of the gate operator of FIG. 8 shown with its weather cover removed for clarity of illustration;

FIG. 10 provides a fragmentary elevation view of a gate operator embodying the present invention moving a "barrier" gate relative to a gate opening between opened and closed positions; and FIG. 11 is a somewhat schematic perspective view of the gate operator mechanism of FIG. 10 shown without its housing for clarity of illustration.

DETAILED DESCRIPTION OF EXEMPLARY PREFERRED EMBODIMENTS OF THE INVENTION

Figure 1:
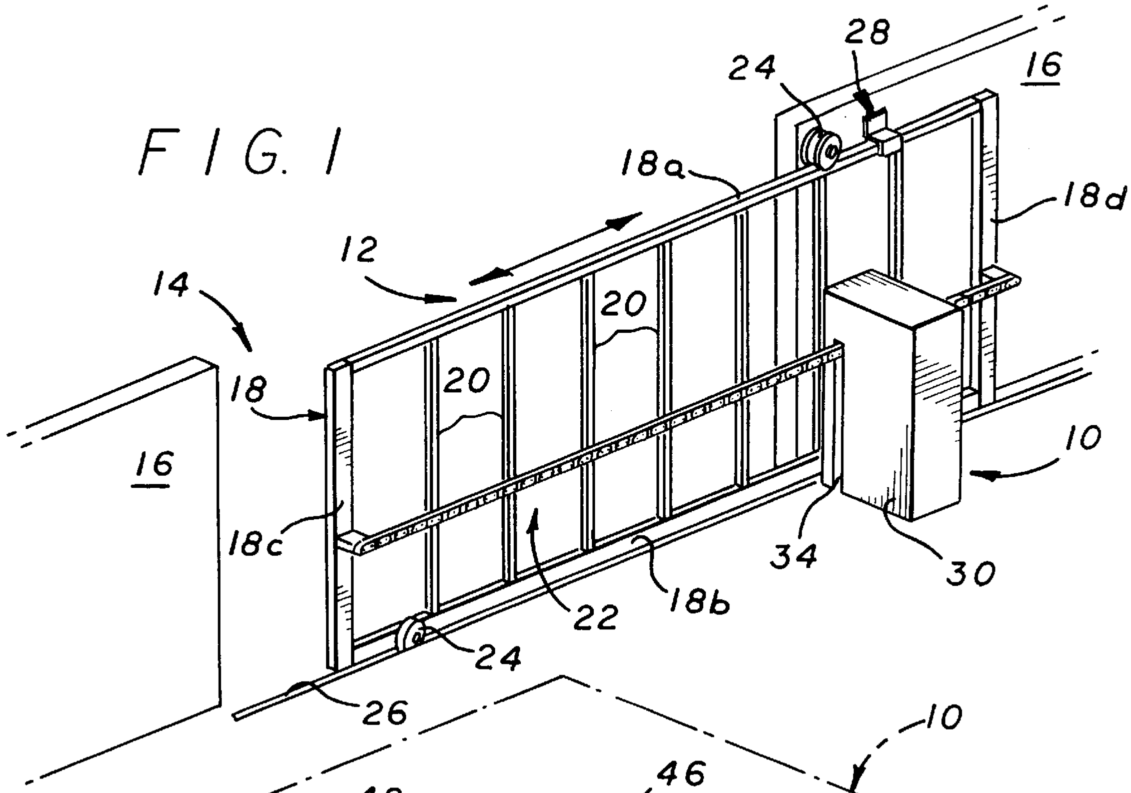

Viewing first FIG. 1, a gate operator 10 is connected to a gate 12 to move the gate between opened and closed positions with respect to a gate way 14 in a wall or fence 16. In this case, the gate 12 is of "sliding gate" style, although the present invention in other embodiments can be used with gates of other configurations, as will be seen. More particularly, the gate 12 includes a gate frame 18 having a plurality of vertical bars 20 extending between upper and lower horizontal portions 18*a* and 18*b* of the frame 18. At its opposite ends, the gate frame 18 includes vertical frame members 18*c* and 18*d*, between which extends an elongate drive chain 22. The gate frame 18 is carried on a pair of guide wheels 24 (only one of which is seen in FIG. 1), which roll along a guide track 26 extending along the ground. Attached to the wall 16 (or to a post of the fence, for example) is an upper guide assembly 28.

Those ordinarily skilled in the pertinent arts will known that the upper guide assembly may include a pair of spaced apart rollers (not individually illustrated) which guide and constrain the upper horizontal member 18*b* of the frame 18. Accordingly, it is seen that the gate 18 is movable horizontally along the guide track 26 between an opened position allowing ingress and egress of vehicles and personnel (for example) via the gate way 14, and a closed position in which the gate 12 closes the gate way 18. In FIG. 1, the gate 12 is depicted in a position intermediate of its fully opened and fully closed positions.

Figure 2:
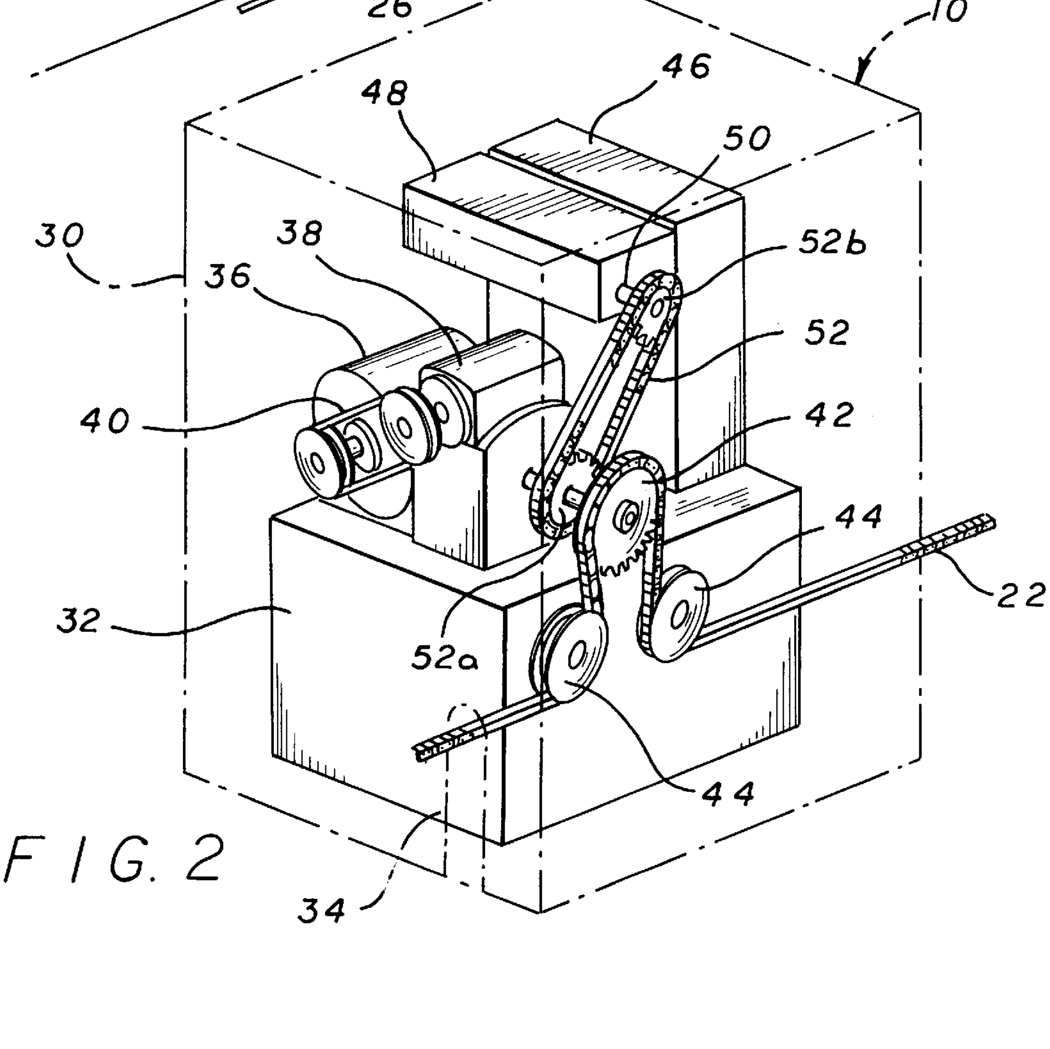

The elongate drive chain 22 extends through a weatherproof cover 30 of the operator 10, and the operator 10 is effective as will be further seen below to drive the chain 22 (and gate 12) from side to side in order to open and close the gate. Viewing FIG. 2, it is seen that the gate operator 10 includes a base 32 over which the cover 30 is fitted, and that this cover 30 defines a pair of openings or slots 34 (only one of which is shown in FIG. 2) allowing the drive chain 22 to pass through this cover. The base 32 carries a reversible electric motor 36 drivingly connected to a gear reduction unit 38 by a drive belt 40 trained over respective pulleys. In this case, the gear reduction unit 38 is of worm gear type, and provides a speed reduction ratio of about 30:1, although the invention is not limited to this or any other type of speed reduction. Advantageously, the worm gear type of gear reduction unit provides a no-back drive arrangement for the gate 12. However, other types of drive mechanisms may be used alternatively. For example, a spur-gear type of gear reduction might be used, or one using entirely chains and sprockets, or using entirely belts an pulleys, or a mix of chains and belts might be used in the drive mechanism.

Still viewing FIG. 2, it is seen that a drive sprocket 42 is carried on the output shaft of the gear reduction unit 38, and the drive chain 22 is trained about this sprocket 42 by a pair of flanged guide wheels 44. Effectively, the output sprocket 42 is the output member of the gate operator 10, and rotation of this sprocket translates directly to movement of the gate 12 (recognizing that there will inevitably be some lost motion or slack in the mechanical connection effected by drive chain 22). Carried also by the base 32 and associated with the motor 36 is an electronics unit 46, the structure and functions of which will be further explained below. This electronics unit 46 includes a gate movement measuring unit, generally indicated with the numeral 48.

Figure 3:
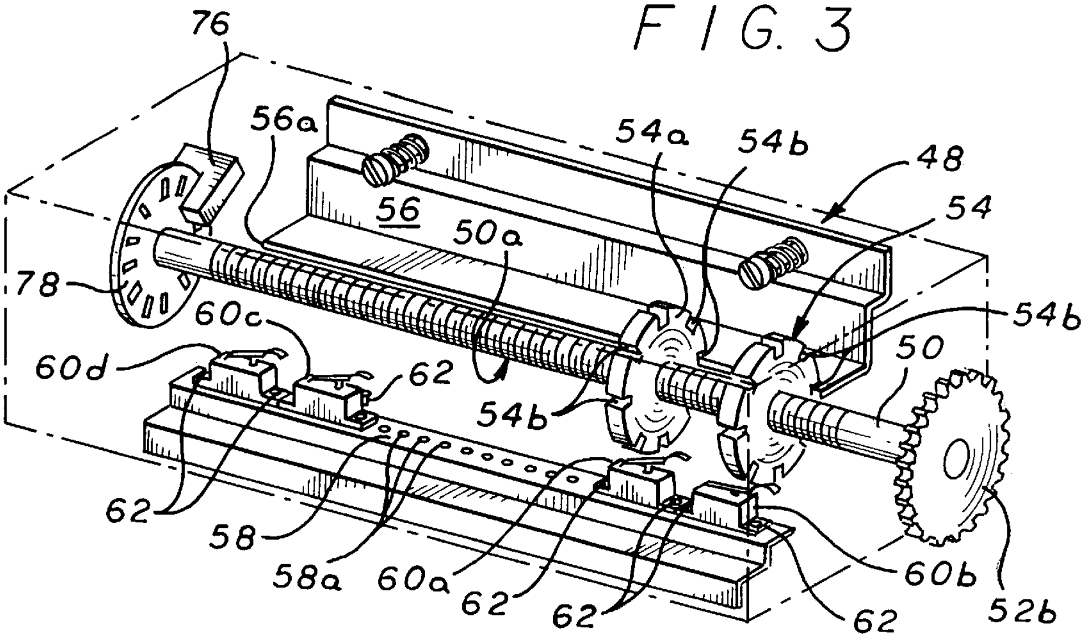

As is seen in FIGS. 2 and 3, the gate movement measuring unit 48 includes a rotational shaft 50 which is coupled to rotate simultaneously and in proportion to rotation of the drive sprocket 42. In this case, the driving connection between shaft 50 and sprocket 42 is effected by means of a chain 52 trained over respective sprockets 52*a* and 52*b*, each drivingly associated with one of the sprocket 42 and shaft 50. As is seen, the chain 52 and its sprockets in this case provide an over-driving (i.e., rotational speed increase) relationship between the sprocket 42 and shaft 50, although the invention is not limited to this relationship. In other words, and as will be appreciated in view of alternative embodiments disclosed herein, an over-driving relationship, a unity relationship, or an under-driving relationship may be provided between the output member of the gate operator and the gate movement measuring unit 48.

Further considering the gate movement measuring unit 48 as it is schematically seen in FIG. 3, the shaft 50 is seen to include an elongate threaded portion 50*a*. Threadably carried upon the threaded portion 50*a* are a pair of limit disks 54, each having a circumferential outer perimeter surface 54*a* defining a circumferentially spaced apart plurality of axial grooves or notches 54*b*. The gate movement measuring unit 48 includes a movable axially-extending rail member 56, which has an axially extending edge portion 56*a* in its illustrated position slidably engaging into a notch 54*b* of each of the disks 54. Thus, the disks 54 are prevented from turning with shaft 50, but may threadably move axially along this shaft as the shaft rotates. As the disks 54 move axially, they slide along the rail 56 with the edge 56*a* in one of the notches 54*b*. Accordingly, it is seen that position of the disks 54 along the shaft 50 is an analog of the position of the gate 12 between its fully opened and fully closed positions.

The rail member 56 is spring loaded in a conventional way to allow its manual movement away from the shaft 50 to disengage edge 56*a* from the notches 54*b*. In this way, each of the disks 54 may be manually rotated independently of shaft 50 to thread these disks 54 (or each one separately) along the shaft to adjust the relationship of these disks axially along the length of shaft 50 to model the position of the gate 12 between its fully opened and fully closed positions.

Opposite to the rail member 56, the gate movement measurement unit 48 includes an axially extending mounting plate 58 providing a plurality of axially spaced apart mounting holes 58*a*, to which limit switches 60 may be attached by respective fasteners 62 (only one of which is fully visible in FIG. 3) each passing through a portion of the housing of each of the switches 60 and threadably engaging into respective holes 58*a* of the plate 58. The limit switches 60 are arranged in two spaced apart pairs for a total of four switches in this embodiment. The switches are indicated with numerals 60*a*, 60*b* in the first pair, and 60*c*, 60*d* in the second pair. That is, the switches indicated with the first two suffixes are paired, as are the switches indicated with the third and fourth suffixes. In rough approximation, the axial spacing between the pairs of limit switches 60 is an analog of the distance the gate 12 moves between its fully opened and fully closed positions. Similarly, the axial spacing of the pair of disks 54 along shaft 50 is an analog of the length of the gate being moved by the operator. These variables will change with each particular installation of a gate operator. The disks 54 move axially as a pair between the pairs of switches 60 from adjacent one pair to adjacent the other pair as the gate 12 moves between its fully opened and fully closed positions.

During operation of the gate operator 10, as the disks 54 threadably move along the shaft 50 in response to rotation of this shaft by operation of the operator 10 moving the gate 12, one of the disks 54 moves so as to contact first one switch (i.e., 60*a* or 60*c*) and then the other switch (60*b* or 60*d*) of each pair of switches. In each direction of operation, the one disk 54 closest to a pair of switches 60 is the one that actuates that pair of switches. Attention now to FIG. 4 will show that the switches 60 are part of a control circuit 62, the rest of which is housed in electronics unit 46. Preferably, the form of this circuit 62 is a combination of discreet elements carried on one or more printed circuit boards; and also includes one or more integrated circuits (as will be described), although the invention is not limited to this configuration of control circuit.

Figure 4:
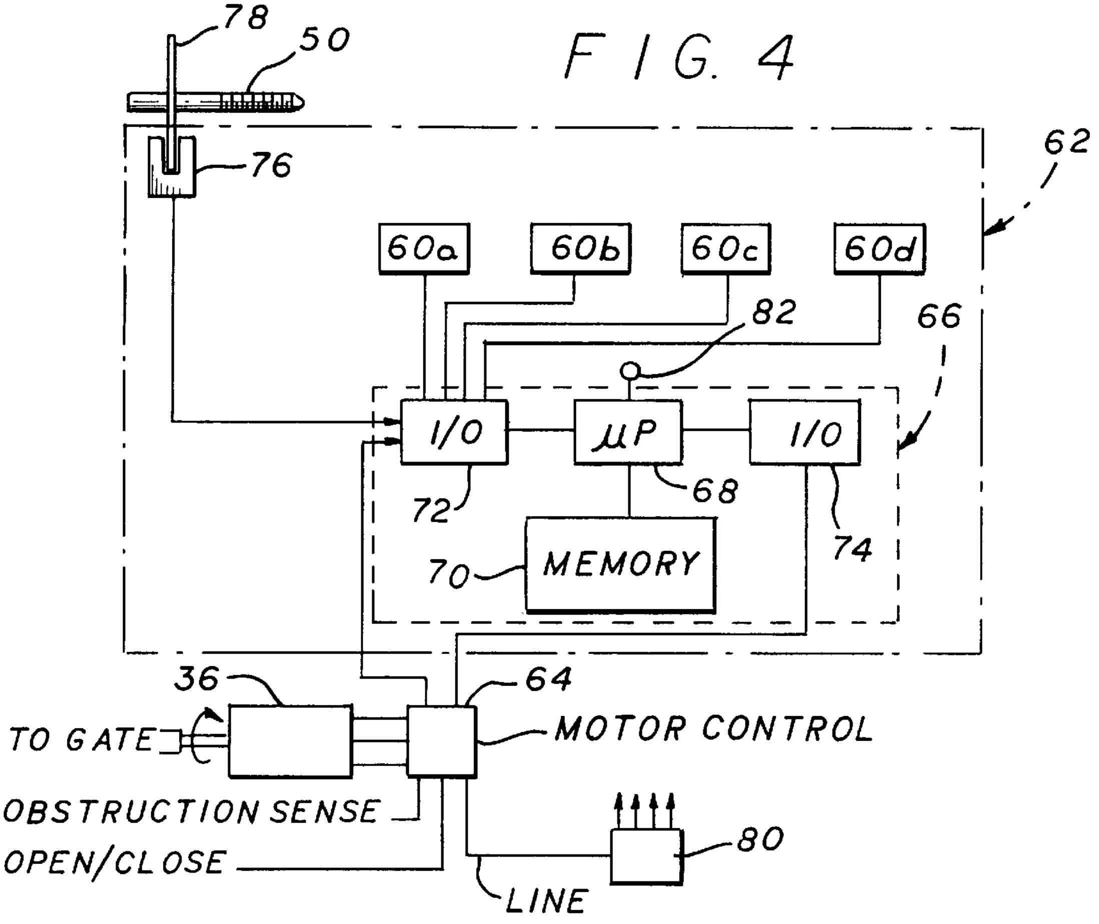

Viewing FIG. 4, it is seen that the control circuit 62 includes a motor control 64, which is conventional. This motor control 64 receives input line power, and provides for reversing operation of the motor 36. This reversing operation of the motor 36 provides for both opening and closing movements of the gate 12, as will be familiar to those ordinarily skilled in the pertinent arts. An open/close input may be provided by a momentary contact switch closure, or a conventional radio remote control may alternatively provide this input. Alternatively, the motor control circuit 64 may be configured for separate "open", "close", and "park" inputs.

In each case, the open/close input causes the motor controller 64 to operate the motor 36 in the direction of operation required to effect either an opening or closing movement of the gate. An additional input from an obstruction sensor (i.e., a sensor using an infrared light source to provide a light beam, and a receiver providing an output signal should the beam be obstructed by an object, for example) may be used to reverse the gate movement during closing movement or to stop the gate (effect a parking of the gate) during closing movement should an obstruction be encountered. Alternatively, the motor control 64 may also have a current-sensing type of obstruction sensing capability in addition to or instead of use of the obstruction sensor input.

Circuit 62 also includes a microprocessor-based control portion, generally indicated with the numeral 66. This microprocessor-based control portion 66 includes a microprocessor 68 with associated memory 70, and input/output (i.e., I/O) devices 72 and 74. I/O device 72 provides for contact closure inputs (i.e., CCI's) to the microprocessor 70 from each of the limit switches 60*a–d*, and also provides for an input from an encoder 76. The encoder 76 is responsive to rotation of a notched or apertured code wheel 78 carried on shaft 50 to indicate rotation of this shaft by the production of pulses, viewing FIG. 3 again. It will be understood that the present invention is not limited to use of any particular form of encoder. In other words, a number of electronic pulses are provided for each rotation of shaft 50 via the encoder 76, and these pulses are a direct indication of movement of the gate.

Any time the shaft 50 turns with the gate operator in operation (whether actually driving the gate or not), the encoder 76 provides pulses indicative of the movement of the gate. The I/O device 74 provides for the microprocessor 68 to provide a control output which will result in motor controller 64 shutting off power supply to the motor 36. In order to complete this description of the circuit 62, it must be noted that a power supply 80 receives line power and provides for operation of the low-voltage integrated circuit devices of the circuit 62.

Figure 5:
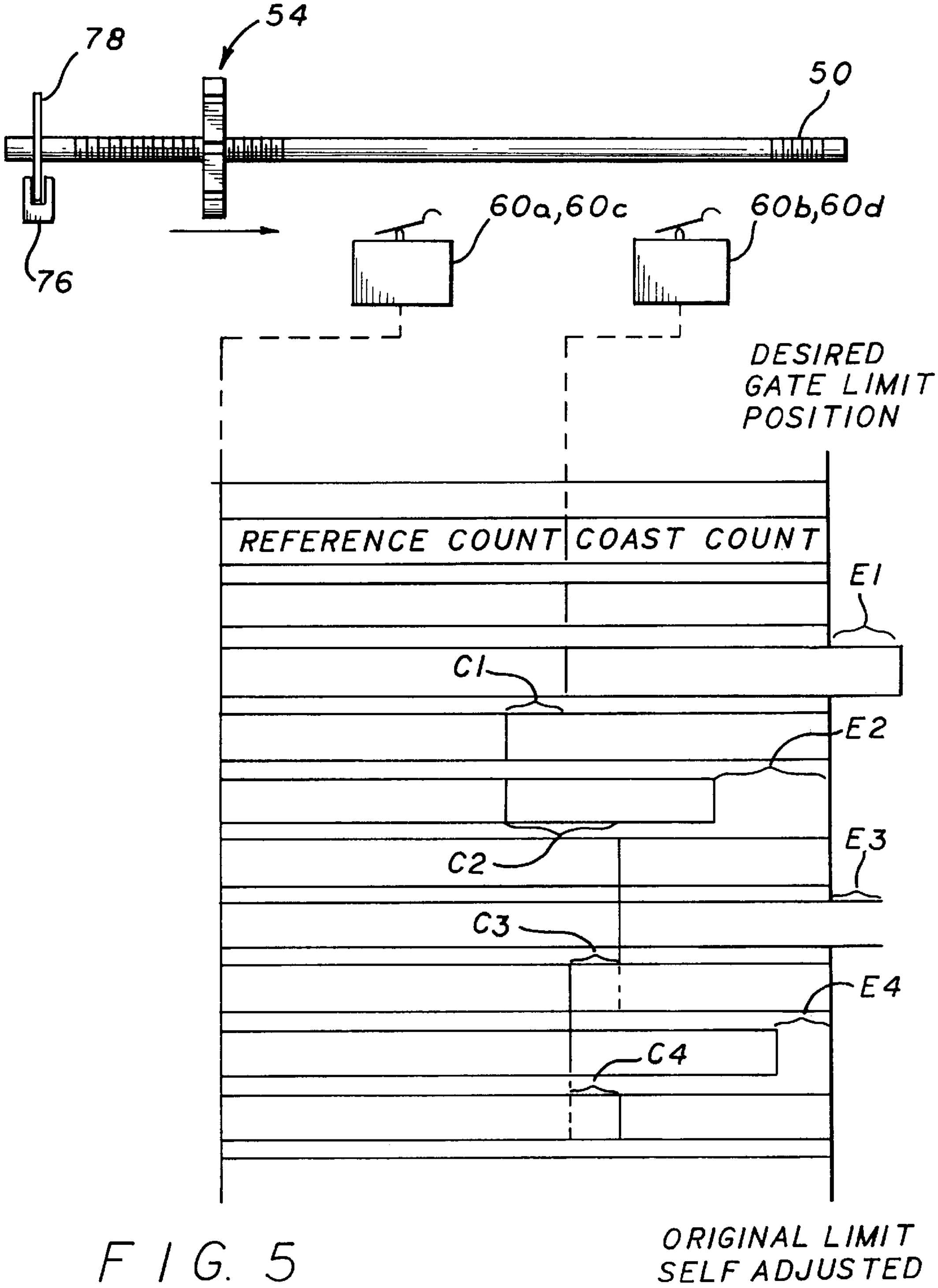

Having observed the structure of the gate operator 10, attention may now be directed to its operation, with attention also to FIG. 5. Recalling the description above, it will be understood that when the user of the gate 12 desires to open or close this gate, a command input is provided to control circuit 64. This command input may be an "open", "close" or "park" command. In the case of gate operators which have an input from a radio control device, the command input may effect an opening of the gate from its closed position, or may effect a closing of the gate from its opened position. Alternatively, the gate operator may automatically close an opened gate after a time interval of being opened. If an obstruction is sensed during either an opening or closing movement of the gate, the operator will stop the gate. If the obstruction was sensed during a closing operation, the gate will be automatically reversed and either go to its fully opened position, as is conventional, or can be configured to open only slightly (i.e., just a few inches to clear the obstruction). On the other hand, it the obstruction was sensed during an opening movement of the gate, the gate is simply stopped, and the next open/close input from the user reverses the gate to close it.

As the gate is opened or closed by the operator 10, the shaft 50 is rotated proportionately to the closing movement of the gate, and the disks 54 thread along this rotating shaft also in proportion to the opening and closing movements of the gate. FIG. 5 shows the relationship of one of the disks 54 with one of the pairs of switches 60(*a*or *c*) and 60(*b*or *d*) as the gate 12 approaches one of its limit positions (i.e., fully opened or fully closed). Because in this instance the relationship of each of the disks 54 with the associated pair of switches 60 is the same at each end of the movement for these disks, explanation of the operation of one disk and its pair of switches suffices to explain both.

FIG. 5 shows ten hypothetical and exemplary successive operations for the gate with respect to one of its limit positions (i.e., either fully opened or fully closed). It will be understood that ordinarily each of these operations of the gate operator 10 will alternate with an operation moving the gate in the opposite direction, and will have a similar interaction of the other disk 54 and its switches 60 at the other limit position. Moreover, as explained, the relationship and interaction of the other disk 54 with the other pair of limit switches 60 is the same so that they are not both described separately herein.

Continuing with consideration of FIG. 5, during the first operation of the gate as the disk 54 moves along shaft 50 during closing or opening of the gate 12 (movement of disk 54 is rightwardly in the illustration of FIG. 5) and trips the first switch 60, the microprocessor 68 begins a count of pulses from encoder 76. On FIG. 5, this count is indicated graphically in the form of a horizontal bar graph, and proceeds from left to right. A certain number of encoder pulses will be recorded after the disk 54 trips the first switch 60*a*/*c* and until the moment the disk trips the second switch 60 *b*/*d*. Under initial operating conditions for the gate operator 10, when the disk 54 trips the second switch 60 *b*/*d*, the microprocessor effects a shut off of power to motor 36 via the I/O device 74 and motor control 64. After the shut off of motor 36, the encoder 76 will continue to operate, and the microprocessor 68 will continue to count these pulses.

Subsequently, the gate 12 coasts to a stop at the position indicated by the line labeled "desired gate limit position". This limit position for the gate is reached without the use of a brake or braking forces on the operating mechanism of the gate 12. In other words, the entire moving mechanism including operator 10 and gate 12 is simply allowed to coast gently to a stop. Hypothetically, this time the gate stopped just at the desired limit position.

Upon operation No. 2, the gate similarly coasts to a stop just at its desired limit position. Consequently, no corrective action is to be taken and the controller 66 will not record any errors from which to predict future corrective actions.

However, upon operation No. 3, the gate for some reason (further explained below) coasts to a stop beyond its desired limit position. In this case, the microprocessor 68 will record a first error value E1, as is indicated by the number of pulses from encoder 76 after the gate passes the desired limit position. One of the reasons the gate may coast beyond its desired limit position is that the time interval since its last operation was short, and the gear box lubricant is still warm from this recent operation and is of lower viscosity. Another reason may be that the ambient temperature is high, with attendant lower viscosity of the gear box lubricant. The microprocessor 68 has an internal clock which records intervals between operations of the gate operator 10, so that a correlation between these intervals and gate position errors can be built up with time. Similarly, the microprocessor 68 has association with an ambient temperature sensor 82 so that a correlation between this variable and gate position errors can be built up also. As the correlations are built up, a predictive relationship between gate position errors and these variables as they exist at any particular moment will be refined.

In the present instance with only the limited operating experience at hand, the operator 10 upon next operation of the gate in the particular direction (i.e., operation No. 4) makes correction C1. Correction C1 in this case is equal to or less than error value E1, and is subtracted from the reference count. The correction value can be greater than the error value under some circumstances, as will be appreciated in view of the following. In this case, as the disk 54 moves to trip switch 60*a*/*c* the reference count starts. The microprocessor 68 will, however, shut off the motor 36 before the disk trips switch 60*b*/*d*. The position of the gate for shut off of power to motor 36 is determined by the magnitude of correction C1. As is seen in FIG. 5 (example No. 4), correction C1 was of the magnitude required, and the gate stops by coasting just to its desired limit position.

On the other hand, on next operation of the gate in this direction (i.e., operation No. 5), the gate 12 stops after coating to a position still short of its desired limit position. The microprocessor records error value E2. Because of error E2, upon operation No. 6, a correction C2 is effected, and is correct. Importantly, correction C2 is effected not with respect to the position of motor shut off that would be set by switch 60*b*/*d*, but with respect to the position previously set by correction C1. The reference count beginning when a disk 54 passes the first switch (either switch 60*a* or switch 60*c*) is increased by the value C2. In other words, as the controller 66 acquired operating history about the combination of gate and operator with which it is associated, it no longer uses the position for motor shut off set by switch (either switch 60*b* or 60*d*), but carries out a progressive iterative correction based on previous values of correction and position errors for the stopping position of the gate which actually occur. However, because prediction C2 was correct in this instance, the predictive data base will not be updated by this successful performance of prediction.

However, operation No. 7 applies the same correction value C2, and results in the gate coasting beyond its desired limit position. Accordingly, error E3 is recorded. Upon operation No. 8, a correction C3 is effected in the location of motor shut off. This correction is effected by modification of the reference count, as is apparent from FIG. 5. Correction C3 is a subtraction with respect to the previous motor shut off position, and turns out to be correct so that the gate stops on operation No. 8 just at its desired limit position. Operations No. 9 and No. 10 have similar error and correction experiences, with operation No. 10 bringing the gate to a stop just at its desired limit position.

Figure 6:
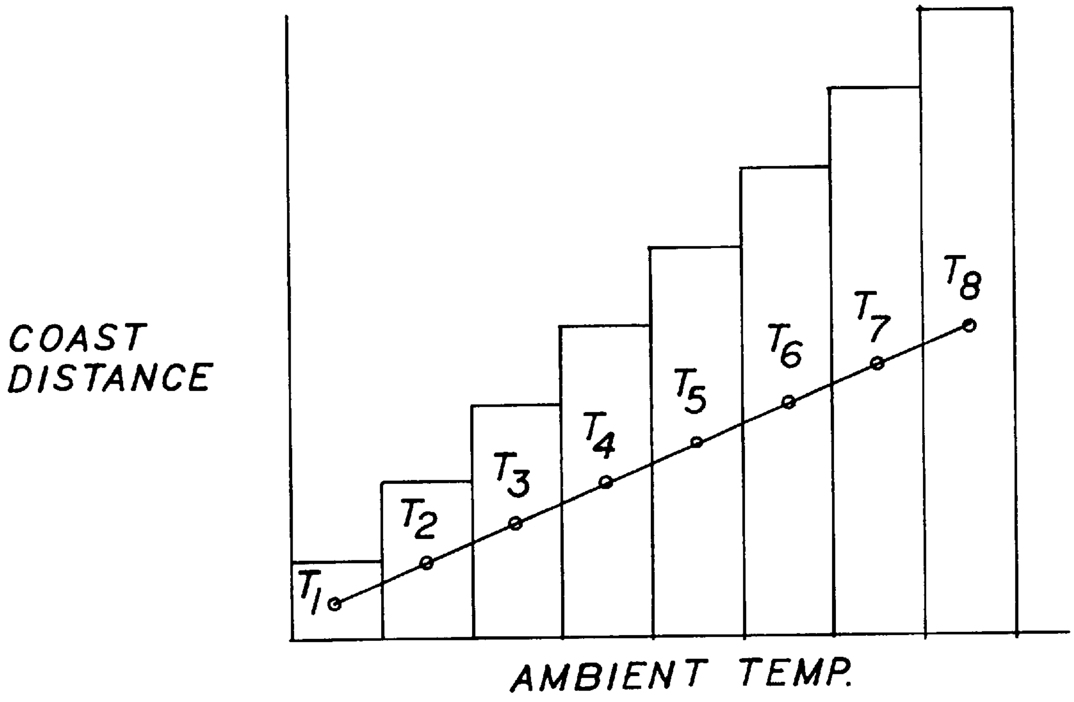
Figure 7:
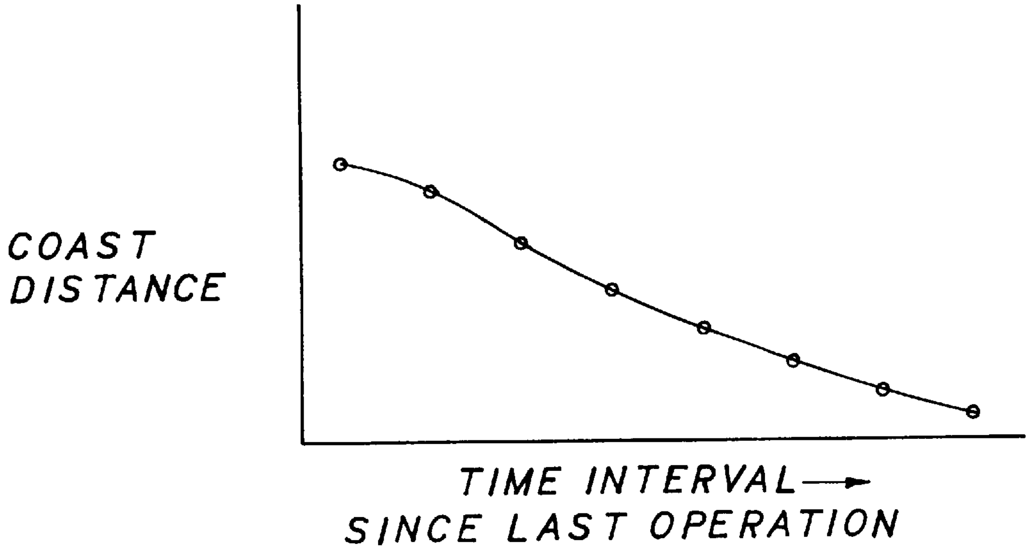

Now, attention to FIGS. 6 and 7 show graphically part of the iterative histograms compiled by a microprocessor 68 using memory 70. Understandably, at the outset of operation of a gate after installation of an operator or after maintenance during which the service technician effects a "reset", these histograms will be empty. However, with the passage of time and acquisition of operating experience, the microprocessor will compile histograms, appearing perhaps like those hypothetical histograms illustrated in FIGS. 6 and 7.

Considering FIG. 6, it is seen that a number of data point fields, designated T1–T8, have been defined, each dependent upon a range of ambient temperatures. In each data field, experience data points (not individually indicated) are inserted by the microprocessor 68 as experience in operating the particular gate is acquired. Within each data field, a point is calculated, representing the average experience with coast dimensions of the gate in that range of ambient temperatures. Now, when the gate operator 10 is to effect an operation of the associated gate in the direction to which the data of FIG. 6 applies, the ambient temperature indicated by sensor 82 will be consulted, and a correction factor indicated by the dashed extrapolation line connecting the various data points of FIG. 6 will be applied also to the error factor (if any) from the previous operation of the gate in the particular direction. If no error on the previous operation was experienced, only an ambient temperature correction will be applied in determining the value of the reference count at which the motor 36 will be shut off.

Similarly, FIG. 7 shows a hypothetical histogram of experience acquired by a gate operator, which is compiled with reference to time interval since last operation of the gate. In this case, the coast dimension for the gate shows a exponential time-decay curve, modified near the abscissa by a flattening of the curve, indicating perhaps that the lubricant of the gear box reaches an equilibrium of viscosity versus warming during each operation with increasingly frequent operations (i.e., short time intervals between operations) of the gate. On FIG. 7, the data fields have been omitted, with only the average points and extrapolation line being presented.

Again, when the gate operator 10 is to effect an operation of the associated gate in the direction to which the data of FIG. 7 applies, the time interval since last operation will be consulted, and a correction factor indicated by the dashed line connecting the various data points of FIG. 7 will be applied also to the error factor (if any) from the previous operation of the gate in the particular direction. If no error on the previous operation was experienced, only a time interval correction will be applied in determining the value of the reference count at which the motor 36 will be shut off.

Those ordinarily skilled in the pertinent arts will recognize that upon initial gate installation, or after a memory reset, a service technician will set the approximate limit positions for the gate using a manual adjustment of the disks 54 and limit switches 60. The microprocessor 68 will be provided with a desired limit position for the gate that takes account of the coasting expected. After that time, as the gate operator acquires experience in the operation of the gate, the precision of its motor shut off operations will become better and better predictors of gate coast under various conditions so that the stopping positions for the gate will increasingly agree precisely with that desired. Further, it is recognized that the combination of ambient temperature sensing and consideration of time interval since last gate operation is an analog of determining the temperature and viscosity of the lubricant in the gear box 38.

As was mentioned above, the single factor having the greatest effect on coast dimension for the gate 12 is the temperature of the gear box 38. The cooler this gear box is, the more viscous fluid drag applies to slowing the motor input shaft and to causing a more rapid deceleration of the gate after motor shut off. Accordingly, a temperature sensor could be applied to or within the gear box 38 to provide an indication of this temperature. However, the applicant has determined that providing an analog of this gearbox temperature by use of the ambient temperature and time interval measurements is preferable for cost and service reasons.

Figure 8:
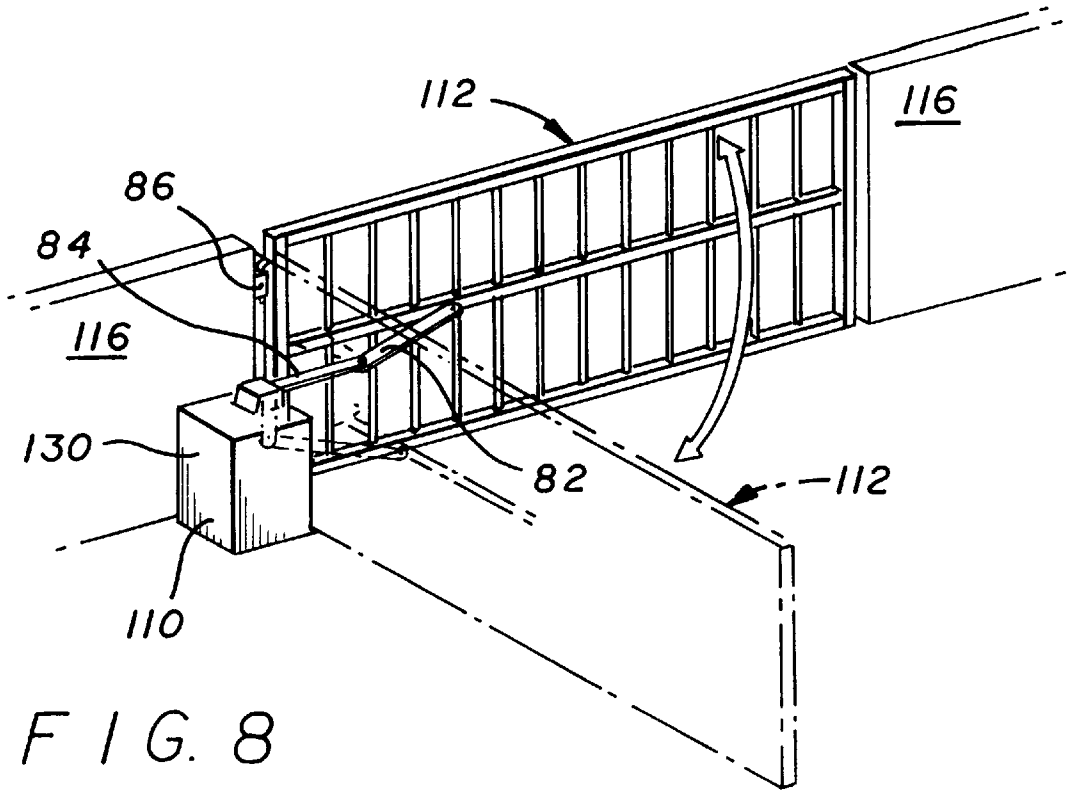
Figure 9:
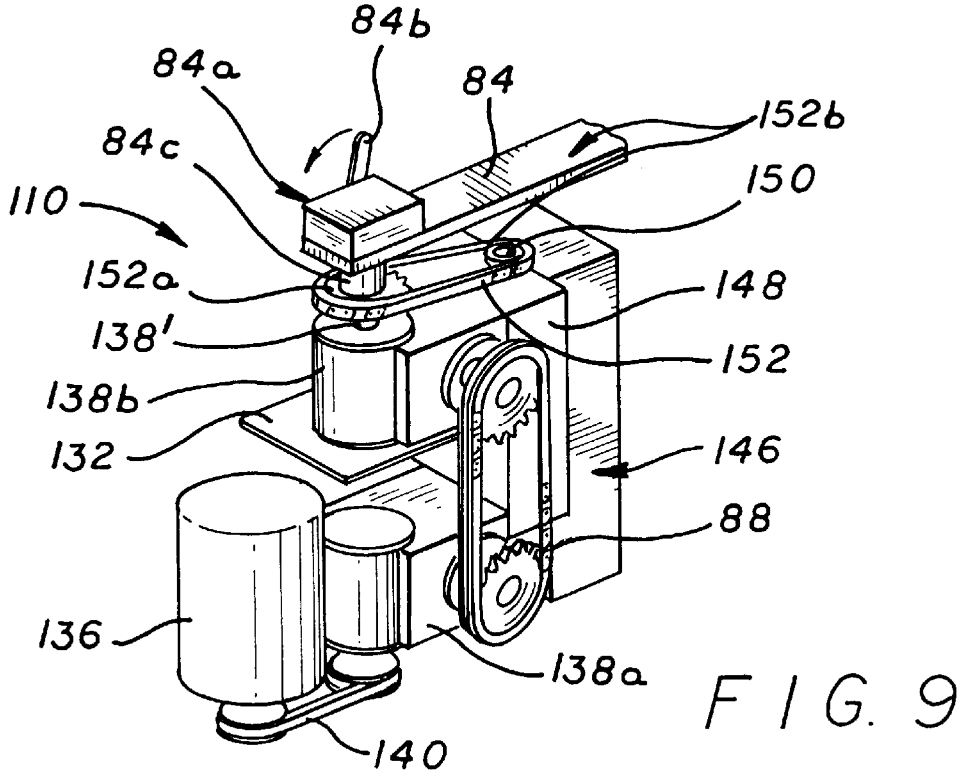

Viewing now FIGS. 8 and 9, an alternative embodiment of the invention is depicted. This embodiment is configured to operate a "swing" gate. In order to obtain reference numerals for use in describing this embodiment, features which are the same (or analogous in structure or function to) those depicted and described above, are indicated on FIGS. 8 and 9 with the same reference numeral used above, and increased by one-hundred (100).

In FIGS. 8 and 9, a gate operator 110 operates a "swing" gate 112 by means of a link 82 which is pivotally connected at one end to the gate, and is also pivotally connected at its opposite end to an output arm 84 of the gate operator. This output arm 84 pivots forcefully through an arc of about 180° in order to effect pivoting of the gate 112 through about 90° between its fully opened and fully closed positions. The gate 112 is hingeably mounted to one of the walls 116, by hinges 86.

Considering FIG. 9, it is seen that this gate operator 110 includes a housing 130 (seen in FIG. 8), and a base 132 upon which is mounted a motor 136 drivingly connected to a first gear reduction unit 138*a* by means of a drive belt 140 trained over respective pulleys. The output shaft of the first gear reduction unit 138*a* is coupled to the input shaft of a second gear reduction unit 138*b* by a drive chain 88 trained over respective sprockets. Second gear reduction unit 138*b* has an output shaft 138' upon which the arm 84 is drivingly mounted. Each of the gear reduction units 138*a* and 138*b* preferably have a 30:1 ratio, so that a compound ratio of 900:1 between the motor 136 and pivotal movement of the arm 84 is provided. As explained, the linkage between arm 84 and gate 112 provides an additional ratio of about 2:1 between pivotal movement of the arm 84 and swinging of the gate 112, although this ratio varies from one installation to the next, and the ratio also varied during swinging of the gate in each instance.

Further viewing FIG. 9, it is seen that the arm 84 is releasably coupled to shaft 138' by a clutch mechanism 84*a* having a control handle 84*b*. In the position of handle 84*b* seen in FIG. 9, the shaft 138' is drivingly connected to the arm 84. When handle 84*b* is pivoted to an alternative position as is indicated by the arrow on FIG. 9, then the arm 84 is freely pivotal on shaft 138'. In other words, when the clutch 84 is released, the gate 112 can be moved manually. However, as is seen in FIG. 9, the arm 84 is drivingly connected by a tubular sleeve 84*c* surrounding shaft 138' to a drive sprocket 152*a*. The drive sprocket is spaced below arm 84 within housing 130 for the operator 110. A chain 152 is trained about sprocket 152*a* and also about a smaller driven sprocket 152*b*. This sprocket 152*b* is drivingly connected to a gate movement measurement unit 148. In this instance, the unit 148 is over-driven with respect to pivoting of arm 84 so that the approximately 180° of rotation of this arm results in plural turns of the shaft 150 of the unit 148. Importantly, the gate measurement unit 148 is driven in response to movement of the gate 112, regardless of whether this movement is in response to rotation of shaft 138', or in response to manual movement of the gate 112.

As with the sliding gate considered above, many of the same considerations apply in getting the swinging gate 112 to stop precisely at selected limit positions. The gate 112 itself may weigh as much as about 1000 pounds, or more, and may have a hinge axis which is truly vertical or which is out of plumb slightly. Additionally, the gate operator 110 now has two gear boxes 138*a* and 138*b*, each of which can have a viscous drag affecting the coasting dimension of the gate 112 after the motor 136 is shut off.

However, the applicant believes that the same control system and microprocessor-based predictor-corrector control methodology explained above with reference to FIGS. 4–7 can be used with equally beneficial result with the swing type of gate seen in FIG. 8. Accordingly, the operator 110 includes an electronics unit 146 mounted next to the gate movement measurement unit 148. The explanation provided above of how the gate operator "learns" from experience when and to what degree to provide a predictive correction in the shutting off of motor 136 applies equally to this embodiment of the invention.

Figure 10:
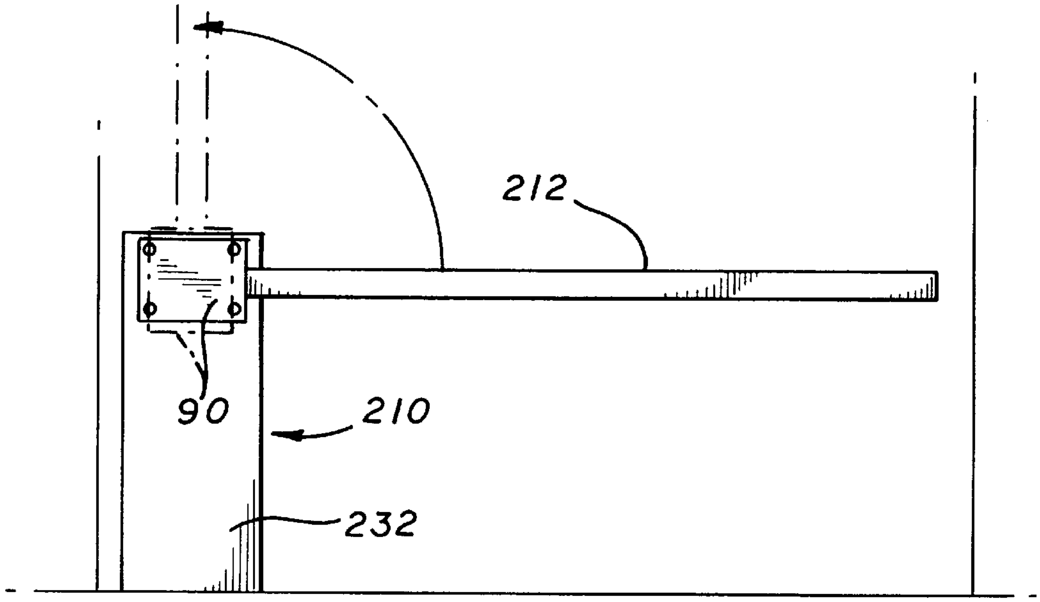
Figure 11:
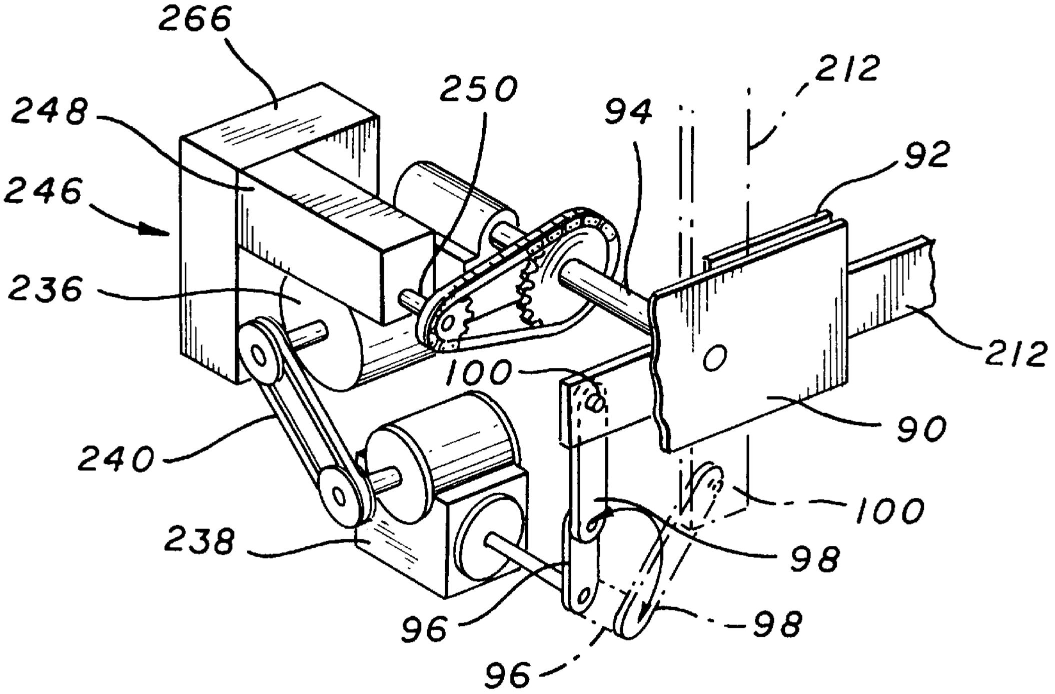

Turning now to FIGS. 10 and 11, yet another embodiment of the present invention is depicted. This embodiment is configured to operate a "barrier" gate. In order to obtain reference numerals for use in describing this embodiment, features which are the same as (or analogous in structure or function to) those depicted and described above, are indicated on FIGS. 10 and 11 with the same reference numeral used above, and increased by two-hundred (200) over the first embodiment.

In FIGS. 10 and 11, a gate operator 210 operates a "barrier" gate 212, which is an elongate member clamped by bolts between two plates 90 and 92. One of the plates (i.e., plate 92) is carried by a rotational shaft 94 journaled near the top of the base 232 of the gate operator 212. This output shaft 94 pivots through an arc of about 90° in order to effect pivoting of the gate arm 212 between its fully opened and fully closed positions, as are seen in FIG. 10 in solid and phantom lines, respectively. Considering FIG. 11, it is seen that this gate operator 210 includes a motor 236 drivingly connected to a gear reduction unit 238 by means of a drive belt 240 trained over respective pulleys. The output shaft of the gear reduction unit 238 carries a crank arm 96 coupled by a link 98 to a longer lever arm 100 drivingly connected to and carried by shaft 94. The link 98 rotationally connects to crank arm 96 and pivotally connects to arm 100. The crank arm 96, link 98, and lever arm 100 form a four-bar kinematic linkage, which results in shaft 94 pivoting through substantially 90° in response to a rotation of the crank arm 96 pivoting through an arc of slightly less than 180°, as is indicated by the arcuate arrow on FIG. 11. Drivingly connected to the shaft 94 is a gate movement measurement unit 248. In this instance also, the unit 248 is over-driven with respect to pivoting of shaft 94 so that the approximately 90° of rotation of this shaft results in plural turns of the shaft 250 of the unit 248.

During operation of such a barrier gate operator, the motor 236 is operated to rotate the crank arm 96 through about 180°, moving the gate arm 212 to its opened position. At this position of the gate arm, the motor is stopped or paused while vehicular traffic, for example, leaves or enters a parking garage. In most installations, the opened, paused position of the arm 212 need not be precisely vertical. Accordingly, a simple limit switch in the unit 248 may be used and set for approximating a vertical opened, paused position for the gate 212. After the traffic vehicle has passed, however, the motor 236 is again operated, this time in the reverse direction of rotation to bring the crank arm 96 back to the solid line position seen in FIG. 11. In this instance, if the crank arm 96 either stops short of its intended position, or coasts beyond this position, then the gate arm 212 will rest in a closed position that is either above or below true horizontal, respectively.

As explained above, with conventional barrier gate operators, depending upon the adjustment of the mechanism and the wear of the mechanism experienced with the passage of time and the accumulation of many cycles of gate operation, the barrier gate arm may stop in a sagged position below horizontal. This is undesirable, so with respect to the closed limit position of the barrier gate arm, the operator 210 in gate movement measurement unit 248 includes the apparatus and uses the methodology explained above to insure that the motor 236 is shut off at the proper moment so that the coasting of the mechanism brings it to a stop with arm 212 in its desired horizontal position.

The explanation provided above of how the gate operator "learns" from experience when and to what degree to provide a predictive correction in the moment at which motor 236 is shut off applies equally to the embodiment of the invention seen in FIG. 11. It will be appreciated that the gate movement measurement unit 248 may alternatively include a pair of limit switches for each limit position, and may thus use predictive/corrective methodology at both limits of gate movement if desired. Further, it will be noted that because the gate movement measurement unit 248 is over-driven with respect to pivotal movement of the shaft 94 (and arm 212), the magnitude of error in the position of arm 212 away from horizontal which can be detected and corrected is very small. As explained above, the control system 266 learns from multiple operations of the gate operator 210 how to shut off the motor 236 at precisely the right time in movement of the gate 212 so that the arm stops at a horizontal position in this case.

While the present invention has been depicted, described, and is defined by reference to several particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

I claim:

1. A method of power-operating a movable gate member, the method comprising steps of:

providing an electric motor;

coupling the electric motor by a speed reduction drive to the movable gate to move the gate between opened and closed positions;

operating the electric motor to move the gate toward a desired limit position;

as the gate moves toward the desired limit position, shutting off the electric motor;

measuring the deviation between the desired limit position and the position at which the gate actually stops after the electric motor is shut off;

calculating a correction factor that is a function of the deviation measurement;

after calculating the correction factor, applying the correction factor to shut off the electric motor during a subsequent operation of moving the gate toward the desired limit position in order to reduce the deviation between the desired limit position and the position at which the gate actually stops; and sensing ambient temperature, compiling a historical data base of deviation measurements, as calculated between a predefined limit position and the position at which the gate actually stops on each occasion, versus ambient temperature on each occasion, and using the data base to provide a further correction factor applied in shutting off the electric motor during an operation moving the gate toward the desired limit position.

2. The method of claim 1 further including the steps of measuring a time interval since a last-previous operation of the electric motor to move the gate between an opened and a closed position; compiling a historical data base of deviation measurements versus time interval on each occasion, and using said data base to provide a further correction factor applied in shutting off the electric motor during an operation moving the gate toward the desired limit position.

3. A gate operator comprising:

an electric motor and motor controller circuit;

a speed reduction gear train coupling said electric motor to a gate for moving the gate between opened and closed positions;

a limit switch assembly having an element drivingly coupled to the gate to move between corresponding first and second positions in response to movement of the gate between opened and closed positions, said limit switch assembly including at least one limit switch responsive to movement of said element between said first and second positions;

an encoder associated with said element for providing a pulse train responsive to movement of said element between said first and second positions;

a microprocessor-based control system including a memory facility and receiving said pulse train and an input from said limit switch at a particular position of the gate, and responsively providing an output signal to shut off said electric motor, said control system recording in said memory facility a value indicative of a pulse count from said pulse train which value is indicative of coasting of the gate to a stop position after shut off of said electric motor, said control system including means for effecting a comparison between said stop position of the gate and a desired limit position of stopping for the gate, and said control system further predicting gate coast on a future operation based on said recorded value to adjust shutting off of said electric motor during the future operation to coast the gate to a stop position substantially at said desired limit position; and a temperature sensor, said memory facility having a historical data base of deviation measurements of stopping positions for said gate from said desired limit position versus temperatures measured by said temperature sensor.

4. The gate operator of claim 3 wherein said speed reduction gear train includes a worm-gear train with a worm element driven by said electric motor and an output gear element driving the gate, said worm-gear train providing a no-back drive relationship between said gate and said gate operator so that the gate cannot be opened without authorization by the application of force to said gate.

5. The gate operator of claim 4 wherein said limit switch assembly element includes a shaft member having a tread portion, said shaft member being drivingly coupled to said gate via connection in driving relation to said output member of said speed reduction gear train to rotate in response to movement of the gate between said opened and said closed positions, and at least one nut member threadably carried upon said thread portion of said shaft member and threading along said shaft member between said first and said second positions as the gate moves between opened and closed positions, said nut member actuating said at least one limit switch at a particular position of the gate.

6. The gate operator of claim 5 wherein said shaft member carries a code wheel, said encoder including a sensor providing a pulse train in response to rotation of said code wheel.

7. The gate operator of claim 5 wherein said microprocessor-based control system includes an input facility for receiving said input from said limit switch, and an output facility for providing a motor operation enabling output to said motor control circuit.

8. The gate operator of claim 3 wherein said limit switch assembly includes two limit switches associated with one of said opened and said closed positions of the gate, said nut member actuating a first of said two limit switches as the gate approaches said desired limit position at one of said opened or said closed positions of the gate, and then actuating the second of said two limit switches; said microprocessor-based control system starting recordation of said pulse train upon receiving a first actuation input signal from said first limit switch, and said control system either providing a motor shut-off output signal upon receiving a second actuation input signal from said second switch or applying a correction factor based upon a previously recorded coast factor pulse count for the gate recorded in said memory facility and providing a motor shut-off output signal upon occurrence of an equal number of pulses after said first actuation input signal.

9. A gate operator for a sliding gate having opened and closed positions with respect to a gateway, said gate operator comprising:

a base;

an electric motor mounted to said base;

a motor controller circuit;

a speed reduction gear train mounted to said base and drivingly coupling said electric motor to said sliding gate for moving the gate between the opened and closed positions, said speed reduction gear train including an output member drivingly engaging an elongate flexible tension element extending along a length of the gate to pull the gate between the opened and closed positions;

a limit switch assembly having a rotational shaft member drivingly coupled to said output member to rotationally move between corresponding first and second positions in response to movement of the gate between opened and closed positions, said shaft member including a thread portion, and said limit switch assembly including at least one non-rotational nut member threadably carried on said thread portion for axial movement between corresponding first and second axial positions in response to movement of the gate between the opened and closed positions, at least two limit switches both associated with one of said opened position or with said closed position for said gate and each responsive to movement of said nut member between said first and second positions to provide switch-actuation outputs;

an encoder associated with said shaft member for providing a pulse train responsive to rotation of shaft member between said first and second positions;

a microprocessor-based control system including a memory facility and receiving said pulse train and said switch-actuation outputs from said two limit switches, and responsively providing an output signal to shut off said electric motor, said control system recording in said memory facility a first value indicative of a pulse count from said pulse train beginning from a first of said switch-actuation outputs and continuing to stopping of the gate and also recording a second value from pulse train beginning either from a second of said switch-actuation outputs or from shutting off of said motor and continuing to stopping of the gate which value is indicative of coasting of the gate to a stop position after shut off of said electric motor, said control system including means for effecting a comparison between said stop position of the gate and a desired limit position of stopping for the gate, and said control system further predicting gate coast on a future operation based on said recorded value to adjust shutting off of said electric motor during the future operation to coast the gate to a stop position substantially at said desired limit position; and a temperature sensor, said memory facility having a historical data base of deviation measurements of stopping positions for said gate from said desired limit position versus ambient temperature.

10. The gate operator of claim 9 wherein said speed reduction gear train includes a worm-gear train with a worm element driven by said electric motor and an output gear element driving the gate via said output member, said worm-gear train providing a no-back drive relationship between said gate and said gate operator so that the gate cannot be opened without authorization by the application of force to said gate.

11. The gate operator of claim 9 wherein said shaft member carries a code wheel, said encoder including a sensor providing a pulse train in response to rotation of said code wheel.

12. The gate operator of claim 9 wherein said microprocessor-based control system includes an input facility for receiving said switch-actuation output signals from said two limit switches, and an output facility for providing a motor operation enabling output to said motor control circuit.

13. The method of claim 9 wherein said control system includes means for measuring a time interval between a last previous operation of said gate operator until the next subsequent operation of the gate operator, and said memory facility includes a historical data base of deviation measurements of stopping positions for said gate from said desired limit position versus time interval.

14. A gate operator for a swing gate having opened and closed positions with respect to a gateway, said gate operator comprising:

a base;

an electric motor mounted to said base;

a motor controller circuit;

a two-stage speed reduction gear train mounted to said base and drivingly coupling said electric motor to an output arm and link coupling to said gate to swing said gate between the opened and closed positions;

a limit switch assembly having a rotational shaft member drivingly coupled to said output arm to rotationally move between corresponding first and second positions in response to swinging of the gate between opened and closed positions, said shaft member including a thread portion, and said limit switch assembly including at least one non-rotational nut member threadably carried on said thread portion for axial movement between corresponding first and second axial positions in response to swinging of the gate between the opened and closed positions, at least two limit switches both associated with one of said opened position or with said closed position for said gate and each responsive to movement of said nut member between said first and second positions to provide switch-actuation outputs;

an encoder associated with said shaft member for providing a pulse train responsive to rotation of shaft member between said first and second positions;

a microprocessor-based control system including a memory facility and receiving said pulse train and said switch-actuation outputs from said two limit switches, and responsively providing an output signal to shut off said electric motor, said control system recording in said memory facility a first value indicative of a pulse count from said pulse train beginning from a first of said switch-actuation outputs and continuing to stopping of the gate and also recording a second value from pulse train beginning either from a second of said switch-actuation outputs or from shutting off of said motor and continuing to stopping of the gate which value is indicative of coasting of the gate to a stop position after shut off of said electric motor, said control system including means for effecting a comparison between said stop position of the gate and a desired limit position of stopping for the gate, and said control system further predicting gate coast on a future operation based on said recorded value to adjust shutting off of said electric motor during the future operation to coast the gate to a stop position substantially at said desired limit position; and a temperature sensor said memory facility having a historical data base of deviation measurements of stopping positions for said gate from said desired limit position versus ambient temperature.

15. The gate operator of claim 14 wherein said two-stage speed reduction gear train includes a first worm-gear speed reduction unit with a worm element driven by said electric motor and an output gear element, a second worm-gear speed reduction unit with a worm element driven by said output gear element of said first worm-gear speed reduction unit and an output gear element swinging the gate via said output arm and link, said two-stage speed reduction gear train providing a no-back drive relationship between said gate and said gate operator so that the gate cannot be forced to swing open without authorization by the application of force to the gate.

16. The gate operator of claim 14 wherein said shaft member carries a code wheel, said encoder including a sensor providing a pulse train in response to rotation of said code wheel.

17. A barrier gate operator for raising and lowering a barrier arm gate member between respective opened generally vertical and closed generally horizontal positions, said barrier gate operator comprising:

a base pivotally carrying a shaft member to which is secured said barrier gate arm member;

an electric motor mounted to said base;

a motor controller circuit;

a speed reduction gear train mounted to said base and drivingly coupling said electric motor to an output crank arm;

a link coupling said crank arm to a lever arm drivingly coupling to said shaft member to swing said gate from the closed position to said opened position and back to said closed position in response to rotation of said crank arm through one revolution;

a limit switch assembly having a rotational shaft member drivingly coupled to said shaft member to rotationally move between corresponding first and second positions in response to movement of said gate member between opened and closed positions, said shaft member including a thread portion, and said limit switch assembly including at least one non-rotational nut member threadably carried on said thread portion for axial movement between corresponding first and second axial positions in response to swinging of the gate between the opened and closed positions, at least two limit switches both associated with said closed position for said gate member and each responsive to movement of said nut member between said first and second positions to provide switch-actuation outputs;

an encoder associated with said shaft member for providing a pulse train responsive to rotation of shaft member between said first and second positions;

a microprocessor-based control system including a memory facility and receiving said pulse train and said switch-actuation outputs from said two limit switches, and responsively providing an output signal to shut off said electric motor, said control system recording in said memory facility a first value indicative of a pulse count from said pulse train beginning from a first of said switch-actuation outputs and continuing to stopping of the gate and also recording a second value from pulse train beginning either from a second of said switch-actuation outputs or from shutting off of said motor and continuing to stopping of the gate which second value is indicative of coasting of the gate to a stop position after shut off of said electric motor, said control system including means for effecting a comparison between said stop position of the gate and a desired limit position of stopping for the gate, and said control system further predicting gate coast upon a future operation based on said recorded value to adjust shutting off of said electric motor during the future operation to coast the gate to a stop position substantially at said desired limit position and a temperature sensor, said memory facility having a historical data base of deviation measurements of stopping positions for said gate from said desired limit position versus ambient temperature.

* * * * *